(12) United States Patent
Callon (10) Patent No.: US 7,154,891 B1
(45) Date of Patent: Dec. 26, 2006

(54) TRANSLATING BETWEEN GLOBALLY UNIQUE NETWORK ADDRESSES

(75) Inventor: Ross W. Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 976 days.

(21) Appl. No.: 10/132,117

(22) Filed: Apr. 23, 2002

(51) Int. Cl.
H04L 12/56 (2006.01)

(52) U.S. Cl. ...................... 370/392; 370/401

(58) Field of Classification Search .......... 709/228, 709/227, 220; 370/401, 270, 392
See application file for complete search history.

(56) References Cited

U.S. PATENT DOCUMENTS

| | | | | |
|---|---|---|---|---|
| 6,128,664 | A * | 10/2000 | Yanagidate et al. | 709/228 |
| 6,381,638 | B1 * | 4/2002 | Mahler et al. | 709/220 |
| 6,704,295 | B1 * | 3/2004 | Tari et al. | 370/270 |
| 6,765,920 | B1 * | 7/2004 | Tari et al. | 370/401 |
| 6,870,845 | B1 * | 3/2005 | Bellovin et al. | 370/392 |
| 6,944,167 | B1 * | 9/2005 | McPherson | 370/401 |

OTHER PUBLICATIONS

"Multi-Homing Translation Protocol (MHTP)" M. Py, draft-py-multi6-mhtp-00.txt, Aug. 6, 2001.
"NAT Friendly Application Design Guidelines" D. Senie, draft-ietf-nat-app-guide-06.txt, Jun. 2001.
"Address Allocation for Private Internets" Y. Rekhter et al., RFC 1918, Feb. 1996.
"IP Network Address Translator (NAT) Terminology and Considerations" P. Srisuresh and M. Holdrege, RFC 2663, Aug. 1999.
"Short term NAT Requirements for IPv6 Transition" C. Huitema, draft-huitema-natreq4ipv6-00.txt, Feb. 16, 2001.
"Classless Inter-Domain Routing (CIDR) Overview" Pacific Bell Internet, 1999.

* cited by examiner

Primary Examiner—Hassan Kizou
Assistant Examiner—Albert T. Chou
(74) Attorney, Agent, or Firm—Shumaker & Sieffert, P.A.

(57) ABSTRACT

Network address translation (NAT) translates between globally unique addresses used within a global network and a local network. A method, for example, includes mapping a first set of globally non-routable global addresses to a second set of globally routable global addresses, and forwarding packets in accordance with the mapping. The method may further include assigning the first set of addresses to devices of a local network, and forwarding packets between the devices of the local network and a global network. These techniques may significantly reduce the demand placed on routing devices in a global network.

47 Claims, 4 Drawing Sheets

TRANSLATING BETWEEN GLOBALLY UNIQUE NETWORK ADDRESSES

TECHNICAL FIELD

The invention relates to computer networks and, more particularly, to translating addresses within computer networks.

BACKGROUND

A computer network is a collection of interconnected computing devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets.

The currently implemented IP Protocol Version 4 (IPv4) defines a global address space comprising $2^{32}$ globally unique addresses. Because of the demand for global addresses, a relatively small number of the devices of a local area network (LAN) are assigned globally unique addresses. For example, devices such as firewalls and mail servers may be assigned globally unique addresses. The vast majority of the devices within the LAN are assigned local addresses that are unique to the local network, but not globally.

In order to communicate with devices outside of the local network, such as devices coupled to a global network like the Internet, the devices of the LAN make use of a pool of a limited number of globally unique addresses. The globally unique addresses may, for example, be assigned from an Internet Service Provider (ISP), typically in the form of one or more blocks of global addresses.

More specifically, the local network may contain a network address translation (NAT) device that maps the local addresses of the devices to the global addresses of the pool. The NAT device temporarily maps the local address of a device within the LAN, to one of the globally unique addresses of the pool. The NAT device then translates the addresses of all outbound and inbound packets between the local address of the device and the temporarily assigned global address selected from the pool. The few devices within the local network that have globally unique address, for instance a mail server, may bypass the NAT device and connect directly to the global network. In this fashion, NAT devices help relieve demand for globally unique addresses.

The proposed Internet Protocol Version 6 (IPv6) addresses the lack of available globally unique addresses by increasing the number of available globally unique addresses from $2^{32}$ to $2^{128}$ by defining a 128-bit IP address to replace the current 32-bit address defined by IPv4. The vast availability of globally unique addresses with the implementation of IPv6 allows each device within a local network to be assigned a globally unique address. However, the general increase in use of global addresses that may result from the adoption of IPv6, may cause a significant increase in the load placed on routing devices within the global network. For example, the increased assignment and use of global addresses may significantly increase the size of the global routing tables maintained by the routing devices, which already tend to be significantly large. Maintenance of the global routing tables may require significant increases in computing resources. Consequently, the routing tables may take significant periods to converge to stable states after updates, such as when a network fault occurs. Also, in order to optimize routing in the global Internet, it has been proposed that global IPv6 addresses may be assigned based on the hierarchical topology of the Internet. When a company changes service providers it will be necessary for the global addresses used for that company to change. To change the addresses used by devices in the local network can be a difficult administrative task.

SUMMARY

In general, the invention is directed to techniques for translating between sets of globally unique addresses. More specifically, the techniques differentiate between global addresses that are advertised beyond a local network (herein "globally routable global addresses") and global addresses that are only routed within the local network (herein "globally non-routable global addresses"). The techniques apply network address translation (NAT) to translate between the addresses. An edge router connecting the local network to a global network, for example, may translate the addresses. As one example advantage of this approach, when a company changes its Internet Service Provider, the globally routable global address used for routing in the global network can change, but the addresses used by devices in the local network can stay the same (with translation at the boundary). Alternatively, the addresses used in the local network can be changed gradually over time as is convenient for network operations.

The local network may be a local area network, or a set of networks interconnected by routers. These routers may maintain routes according to the globally non-routable global addresses, the globally routable global addresses, or both. Devices coupled to the local network may make use of network addresses selected only from the globally non-routable global addresses, or may use network addresses selected from both types of global addresses.

As described in detail below, these techniques may be applied to significantly reduce the demand placed on routing devices in global networks. The techniques may be particularly advantageous in reducing the size of the routing tables maintained by the routing devices in environments that make extensive use of global addresses, such as environments that make use of Internet Protocol version 6 (IPv6).

In one embodiment, a method comprises mapping a first set of globally non-routable global addresses to a second set of globally routable global addresses, and forwarding packets in accordance with the mapping. The method may further comprise assigning the first set of addresses to devices of a local network, and forwarding packets between the devices of the local network and a global network. The second set of addresses may be included in routing information maintained by a routing device within the global network, while the first set of addresses can be excluded. In this manner, the size of the routing information may readily be reduced. The mapping may be maintained, for example, within a network address translation (NAT) device.

In another embodiment, a system comprises a local network that connects a set of devices having addresses assigned from a first set of globally non-routable global addresses. A network address translation (NAT) device maps between a second set of globally routable global addresses and the addresses assigned to the devices. The NAT device may, for example, receive packets having destination addresses of the second set, and translates the destination addresses of the packets to the first set for forwarding to the devices. Similarly, the NAT device may receive packets having source addresses of the first set, and translates the source addresses of the packets to the second set for forwarding to the global network.

In another embodiment, a system comprises a local network connecting a set of devices having addresses assigned from a first set of globally non-routable global addresses, and a network address translation (NAT) device to map between a second set of globally routable global addresses and the first set of addresses assigned to the devices. The system further comprises a routing device that maintains routing information in accordance with a topology of a global network, and maintains the routing information to include the second set of addresses and exclude the first set of addresses.

In another embodiment, a computer-readable medium comprises instructions to cause a programmable processor to map a first set of globally non-routable global addresses to a second set of globally routable global addresses, and forward packets in accordance with the mapping.

The invention may provide a number of advantages. An enterprise, for example, may make use of the techniques to map a first set of globally non-routable global addresses to a second set of globally routable global addresses. In this manner, the enterprise may assign the first set of addresses to internal devices coupled to a local network. These techniques may be particularly advantageous in reducing the size of the routing tables maintained by the devices, particularly in environments that make extensive use of global addresses, such as environments that make use of IPv6. Routing devices within the global network need not maintain routing information to include the first set of addresses. For example, in the event the enterprise receives a new block of global addresses, e.g., when the enterprise switches Internet Service Providers or acquires a company, the enterprise need not require that routing devices of the global network maintain all of the global addresses within the routing information. The enterprise may, for example, map the new block of globally routable global addresses to the globally non-routable global addresses currently assigned to the internal computing devices of the enterprise.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
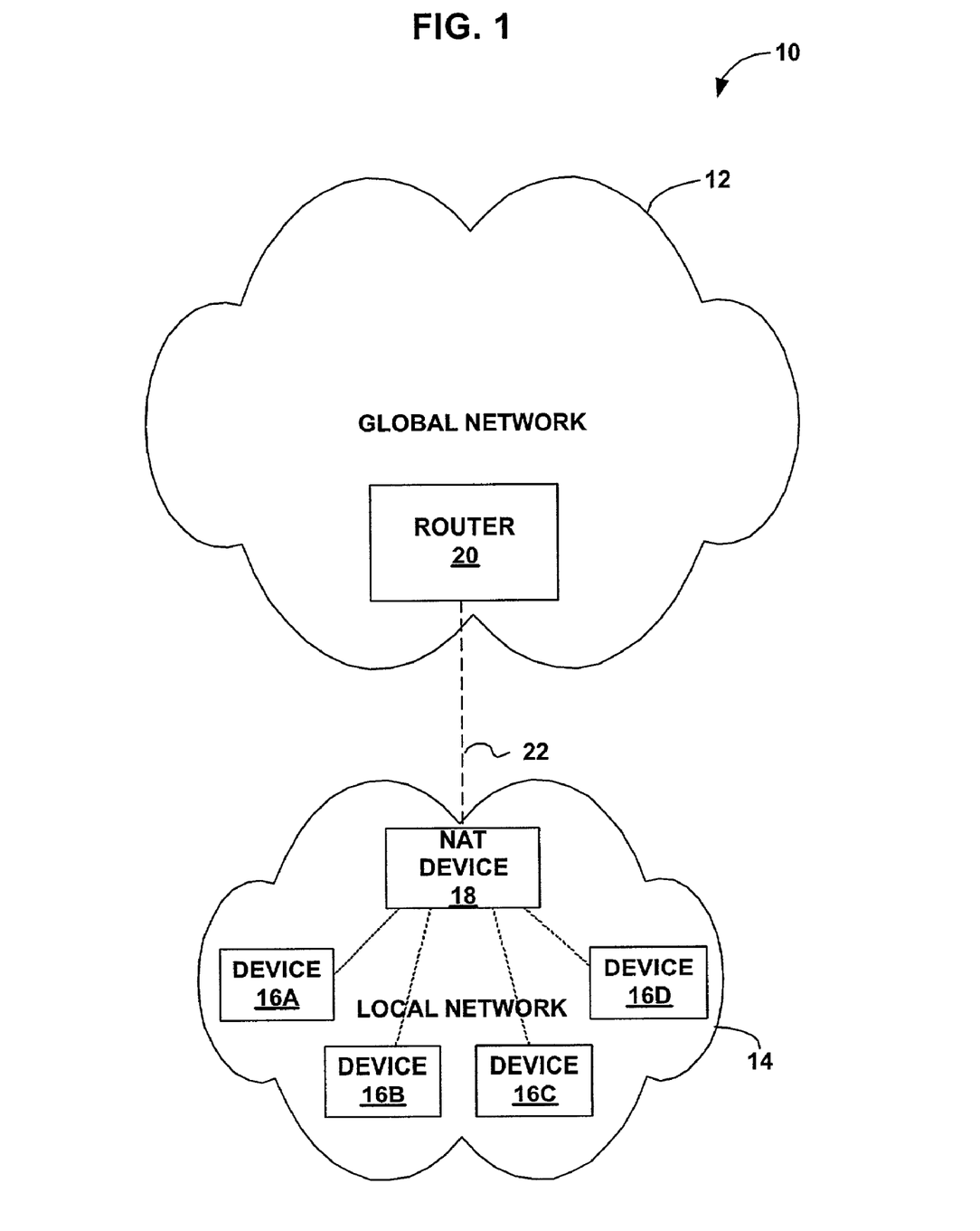
FIG. 1 is a block diagram illustrating a system in which a network address translation (NAT) device translates a first set of globally non-routable global addresses for use within a local network to a second set of globally routable global addresses for use within global network.

FIG. 1 is a block diagram illustrating a system 10 in which a local network 14 is coupled to a global network 12 via access link 22. Local network 14 includes a set of interconnected devices 16A–16D, collectively referred to as devices 16. Example devices 16 may include personal computers, laptops, workstations, personal digital assistants (PDAs), wireless devices, network-ready appliances, filer servers, print servers, and the like. Devices 16 may be connected via Ethernet cable, optical fiber, wireless links, or any other communication medium. Global network 12 represents any network supporting one or more protocols that make use of globally unique addresses, such as the Internet Protocol.

Access link 22 may couple a router 20 residing within global network 12 to a network address translation (NAT) device 18 residing within local network 14. Router 20 routes packets between global network 12 and local network 14 and may reside, for example, within an Internet Service Provider (ISP). Router 20 maintains routing information that describes the topology of global network 12 and, in particular, routes through global network 12. Router 20 periodically updates its corresponding routing information to accurately reflect the topology of global network 12. Access link 22 may comprise any form of communication path for coupling physically separate components, such as optical links, Ethernet and other network connections, wireless connections, and the like.

NAT device 18 facilitates communications between devices 16 and global network 12 by translating between sets of globally unique addresses. In particular, devices 16 of local network 14 may be assigned addresses from one or more sets of globally unique addresses. These addresses may, for example, comply with the IP protocol, such as Pv6, and may be exclusively routed within local network 14, referred to herein as globally non-routable global addresses. Alternatively, the addresses assigned to devices 16 of local network 14 may be a combination of globally non-routable global addresses and addresses that may be advertised to global network 12, as well as within local network 14, referred to as globally routable global addresses.

NAT device 18 maps the globally non-routable global addresses assigned to devices 16 to a set of globally routable global addresses, the globally routable global addresses being available to global network 12 for use within routing information. Accordingly, NAT device 18 facilitates communication between local network 14 and global network 12 by translating the addresses of packets flowing between the networks. NAT device 18 may, for example, comprise a router with network address translation capabilities, or any other device that forwards data between global network 12 and local network 14.

These techniques may be advantageous in reducing the size of routing tables maintained by router 20, and other routing devices within global network 12. Typically, a registration service, such as the InterNIC Registration Service, or an Internet Service Provider (ISP) assigns an enterprise a block of global addresses. In turn, the enterprise may assign the global addresses to devices 16 of local network 14. For example, local network 14 may be configured to support IPv6, which has an expansive global address space.

These techniques may reduce the demand placed on router 20 and other routing devices within global network 12 to support the expansive global address space. For example, in the event the enterprise receives a second set of global addresses, NAT device 18 may be used to map the second set of global addresses to the first set of global addresses currently assigned to the devices 16 of local network 14, and translate between the global addresses such that only the second set is advertised to global network 12. Consequently, router 20 may maintain routing information that includes the second set of addresses, but need not maintain routing information for the first set of addresses. A router (not shown in FIG. 1) located within local network 14 may maintain routing information that makes use of both sets of global addresses. Alternatively, routers located in local network 14 may maintain routing information that makes use of only the first set of addresses. In this manner, the first set of global addresses remain internal to local network 14, and NAT device 18 facilitates communication between local network 14 and global network 12 by translating between the first and second sets of global addresses.

In the case where an enterprise is associated with local network 14, the enterprise may be assigned multiple sets of globally unique addresses in numerous ways. For example, if an enterprise associated with local network 14 switches to a new ISP, the new ISP may assign the enterprise a second set of globally unique addresses. The enterprise may change ISPs for a number of reasons, such as to receive a cheaper rate, or because the current ISP is going out of business. As another example, the enterprise may acquire other enterprises having one or more local networks, as may occur in the merger of two companies. Furthermore, the enterprise may obtain service from two or more ISPs in order to ensure that local network 14 has continuous access to global network 12. In this manner, the enterprise associated with local network 14 may obtain two or more sets of globally unique addresses over time.

In accordance with the principles of the invention, NAT device 18 maintains a mapping between global addresses, such as new globally routable global addresses assigned by an ISP and globally non-routable global addresses assigned to devices 16. Accordingly, router 20 and other routing devices within global network 12 need not maintain routing information to represent all of the global addresses assigned to the enterprise and local network 14.

Local network 14 may be a local area network, or a set of networks interconnected by one or more routers (not shown in FIG. 1). These routers may maintain routes according to the globally non-routable global addresses, the globally routable global addresses, or both. In this manner, devices 16 coupled to the local network 14 may make use of network addresses selected only from the first set of addresses, or may use network addresses selected from both sets of global addresses.

Figure 2:
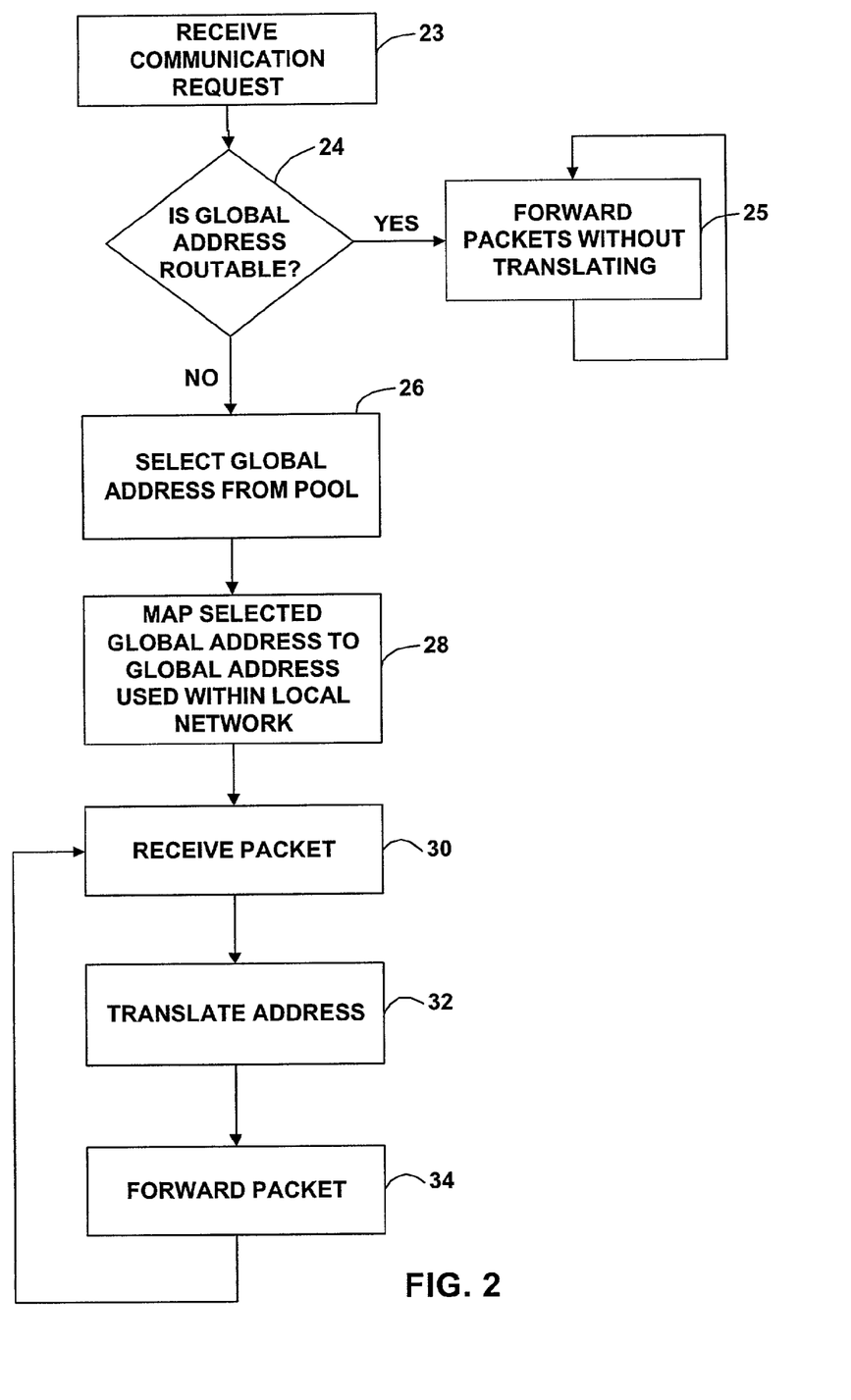
FIG. 2 is a flowchart illustrating an example mode of operation of the network address translation (NAT) device of the system in FIG. 1.

FIG. 2 is a flow chart illustrating an example mode of operation of NAT device 18 of FIG. 1. In particular, the flow chart illustrates in further detail operation of NAT device 18 to map between a first set of global addresses and a second set of global addresses, where the fist set comprises global addresses that are only used within local network 14, and the second set comprises global addresses that are advertised to global network 12.

Initially, NAT device 18 receives a communication request from one of devices 16, such as device 16A of FIG. 1 (23). The communication request may be a request to establish a communication session, such as an http session, with a device within global network 12.

NAT device 18 determines if the network address of the requesting device 16 is routable, i.e., is a global address of the set that is advertised to global network 12 (24). If the address is treated as routable over global network 12, NAT device 18 forwards the packets associated with the requested communication without translation (25).

If the address assigned to device 16A is a global address of the set that is not advertised to global network 12, referred to as a globally non-routable global address, NAT device 18 selects an address from a pool of globally routable global addresses, i.e., the second set of addresses (26). The pool of addresses may, for example, contain a block of addresses assigned to local network 14. Upon selecting the address from the pool, NAT device 18 maps the selected address to an address from the first set.

As illustrated, NAT device 18 may generate the mapping upon receiving from devices 16 requests to access global network 12. Upon completion of the communication, NAT device 18 may "release" the mapping and return the global address of the second set to the pool. In this sense, the mapping may be considered relatively dynamic in that NAT device 18 generates the mapping in response to requests received from devices 16, and releases the mapping upon completion of the communication.

Alternatively, NAT device 18 may generate the mapping prior to receiving requests from devices 16, and may maintain the mapping to service subsequent communication requests from devices 16. In this sense, the mapping may be viewed as a relatively static mapping between global addresses of the pool, and addresses assigned to devices 16.

In any event, to facilitate communication between local network 14 and global network 12, NAT device 18 receives a packet associated with the communication (30), and translates an address within the packet according to the mapping (32). For packets inbound to local network 14, NAT device 18 translates the destination address from the address selected from the pool to the address assigned to the recipient one of devices 16. In addition to translating the destination address within a header of the packet, NAT device 18 may translate the proper checksums, sequence number, or the like. For example, NAT device 18 may need to translate an IP checksum and a TCP checksum.

For outbound packets destined for global network 12, NAT device 18 translates the source address of the packet from the address assigned to the source device in accordance with the mapping. The translation of the address of the outbound packet may again include translation of related checksums, sequence number, or the like.

Upon translating the address, NAT device 18 forwards the packet in accordance with the destination address (34). For example, NAT device 18 forwards outbound packets to global network 12, and inbound packets to local network 14. In this manner, the use of the first set of global addresses that are not advertised outside of local network 14 can be made transparent to router 20. Devices 16 of local network 14 appear to devices within global network 12 as having addresses of the second set, i.e., globally routable global addresses selected from the pool.

Figure 3:
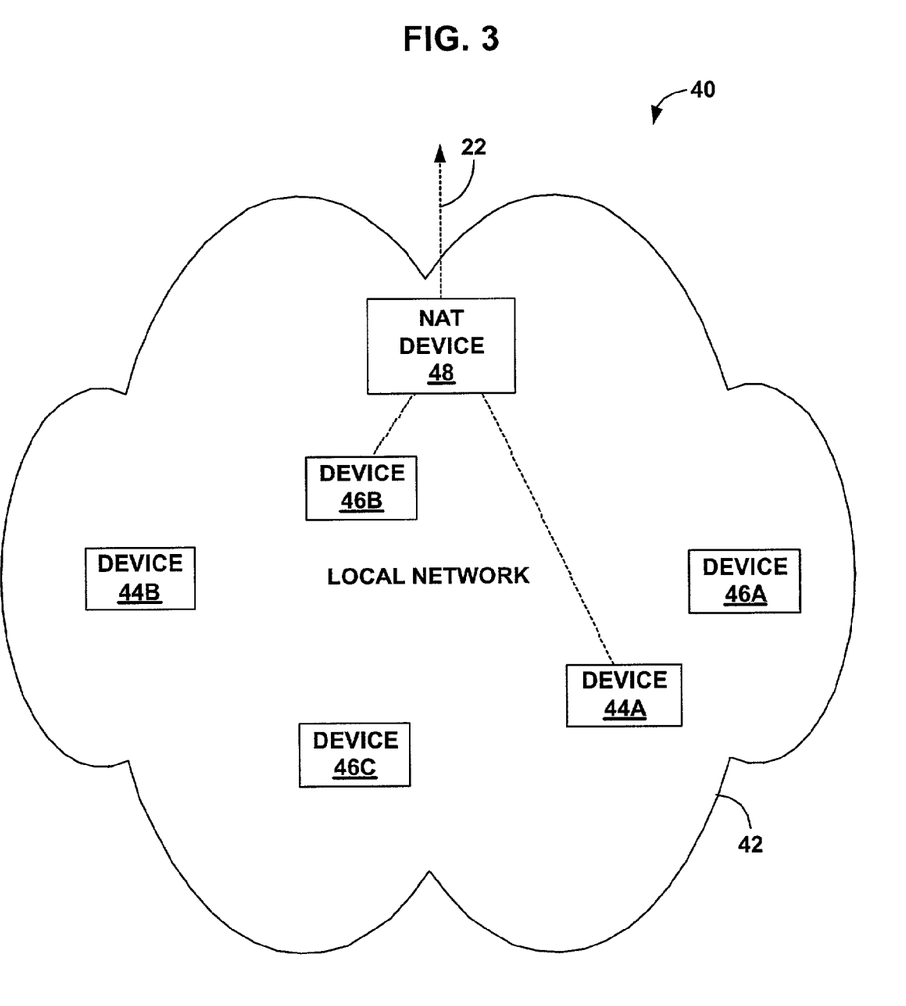
FIG. 3 is a block diagram illustrating a system in which a NAT device supports a local network having one or more devices assigned global addresses, and one or more devices assigned local addresses.

FIG. 3 is a block diagram illustrating an example system 40 in which a NAT device 48 supports a local network 42 having one or more devices 44 assigned global addresses, and one or more devices 46 assigned local addresses. In particular, NAT device 48 translates between a set of globally routable global addresses for use within global network 12, and globally non-routable global and local addresses used internally by local network 42. As described above, NAT device 48 translates addresses of inbound and outbound packets such that the addresses of devices 44, 46 of local network 42 appear transparent to global network 12.

Local network 42 connects a set of devices 44, 46. Devices 44A and 44B, collectively referred to as devices 44, are assigned global device addresses in the same fashion as devices 16 of FIG. 1. Devices 46A to 46C, collectively referred to as devices 46, are assigned addresses that are non-globally unique. In other words, the addresses assigned to devices 46, referred to herein as local addresses, are unique within local network 42, but not within global network 12. For example, the address block 192.0.0.0 through 192.256.256.256 may be used by an enterprise as a set of local addresses internal to local network 42.

Local network 42 may be configured in any manner. For example, client devices may be assigned local addresses, while servers are assigned global addresses. Example devices 46 may be clients having local addresses and may include personal computers, laptops, workstations, personal digital assistants (PDAs), wireless devices, network-ready appliances, and the like. Example devices 44 may be servers having global addresses and may include filer servers, print servers, File Transfer Protocol (FTP) servers, a Domain Name Servers (DNSs), and the like.

For devices 44 that are assigned addresses from a first set of global addresses, i.e, globally non-routable global addresses, NAT device 48 translates between the first set of addresses and a second set of addresses, the second set of addresses containing globally routable global addresses as described above. For devices 44 that are assigned addresses from the second set, NAT device 48 does not translate addresses; rather inbound and outbound packets may simply by-pass NAT device 48. In addition, for devices 46, NAT device 48 translates between the second set of globally routable global addresses for use within global network 12 and local addresses for use within local network 42. The ability of NAT device 48 to translate between a globally routable global address and a local device address enables devices 46, with local device addresses, to access global network 12.

This configuration may be advantageous considering an enterprise associated with local network 42 may not anticipate the need for every one of device 44, 46 to access global network 12. In other words, devices 44, 46 may be added to local network 42 over time. As needed, an administrator for the enterprise may assign a new device a global address or an internal local address. For instance, the administrator may assign a mail server a globally unique address. However, the administrator may elect not to assign a global address to the new device for a number of reasons, such as expense. Regardless, NAT device 48 translates between globally routable global addresses for use within global network 12, and globally non-routable global addresses of devices 44 and local addresses of devices 46, thereby allowing devices 44, 46 to readily access global network 12.

Accordingly, NAT device 48 may maintain separate mappings: a first mapping between the first set of global addresses of local network 42 and the second set of global addresses for use within global network 12, and a second mapping between local addresses for use within local network 42 and the second set of global addresses for use within global network 12. In other words, NAT device 48 may have a pool of global addresses to which devices 44 get mapped, and a second pool of global addresses to which devices 46 get mapped; both pools containing global addresses from the second set. Alternatively, NAT device 48 may maintain a single pool of global addresses from the second set for providing address translation services to devices 44 and devices 46.

In this manner, the use the first set of global addresses as well as local addresses by local network 42 can be made transparent to router 20. Accordingly, router 20 and other routing devices within global network 12 need not maintain routing information to represent the first set of global addresses or local addresses used within local network 42.

Figure 4:
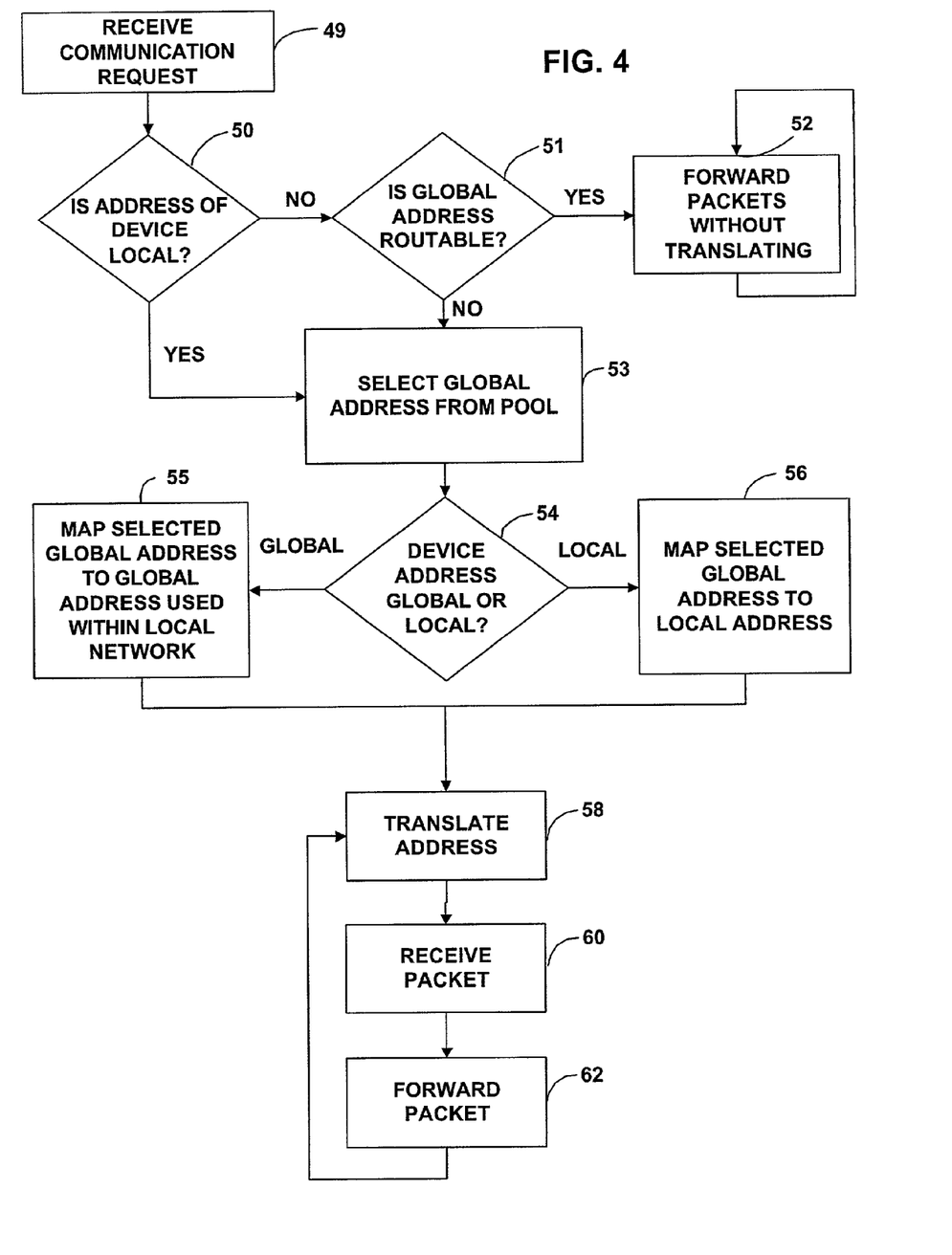
FIG. 4 is a flowchart illustrating an example mode of operation of the network address translation (NAT) device of the system in FIG. 3.

FIG. 4 is a flow chart illustrating in further detail the operation of NAT device 48 of system 40 in FIG. 3. In particular, the flow chart illustrates operation of NAT device 48 to map between a first set of globally non-routable global addresses assigned to devices 44, as well as local addresses assigned to devices 46, and a second set of globally routable global addresses for communicating with global network 12.

Initially, NAT device 48 receives a communication request from a device 44, 46 (49). The communication request may be a request to establish a communication session, such as an http session, with a device within global network 12. NAT device 48 determines if the address assigned to the device 44, 46 is local or global by looking at the source address of the communication request packet (50). If the source address is global, NAT device 48 determines if the global address assigned to a device 44, say 44A, is from the first set or the second set of addresses (51). If device 44A is assigned an address of the second set, NAT device 48 forwards the packets associated with the requested communication with no address translation (52).

If the address assigned to the device is a local address or an address of the first set, NAT device 48 selects an address from a pool of global addresses of the second set (53). The pool of global addresses may, for example, contain the block of globally routable global addresses assigned to local network 42. Alternatively, NAT device 18 may select the address from one of two pools. The first pool may contain a portion of the block of global addresses of the second set for mapping to global addresses of the first set of local network 42, and the second pool may contain another portion of the block of global addresses of the second set for mapping to local addresses of network 42.

For any of devices 44 having global addresses from the first set, such as device 44A, NAT device 48 selects an address from the pool of global addresses for use within global network 12, and maps the selected global address from the pool to the global address assigned to the device (54, 56). For any of devices 46 having local addresses, NAT device 48 selects an address from the pool, and maps the selected global address from the pool to the local address assigned to the device (54, 58). As described above, NAT device 48 may generate the mapping prior to or after receiving access requests from devices 44, 46.

Upon receiving a packet associated with one of devices 44, 46 and global network 12 (58), NAT device 48 translates an address within the packet according to the mapping (60). For example, NAT device may translate between a local address and a global address of the second set, or between a global address of the first set and a global address of the second set, depending on whether the communication involves one of devices 44 or one of devices 46. For packets inbound to local network 42, NAT device 48 translates the destination address from the global address of the second set used within global network 12 to the address assigned to the recipient one of devices 44, 46 according to the mapping. For outbound packets, NAT device 48 translates the source address of the packet from the address assigned to the source device 44, 46 to the corresponding global address of the second set used within global network 12 in accordance with the mapping. Upon translating the address, NAT device 48 forwards the packet in accordance with the mapping and translation (62). For example, NAT device 48 forwards outbound packets to global network 12, and inbound packets to local network 42. In this manner, the use of the first set of global addresses by local network 42, as well as local addresses, can be made transparent to router 20. Accordingly, router 20 need not maintain routing information to include the first set of global addresses, as well as the local addresses.

A number of embodiments of the present invention have been described. Nevertheless, it will be understood that various modifications may be made without departing from the spirit and scope of the invention. Accordingly, other embodiments are within the scope of the following claims.

The invention claimed is:

1. A method comprising:
assigning a first set of addresses and a second set of addresses to an enterprise, wherein a first network communication protocol defines the first set of addresses as globally unique addresses, and wherein a second network communication protocol defines the second set of addresses as globally unique addresses;
maintaining, with a router external to the enterprise, routing information for the second set of globally unique addresses of the second network communication protocol while excluding the first set of globally unique addresses for the first network communication protocol so as to reduce a size of the routing information within the router for the first and second network communication protocols;
mapping, with a network address translation (NAT) device internal to the enterprise, the first set of globally non-routable, globally unique addresses to the a second set of globally routable, globally unique addresses; and
forwarding packets between the enterprise and the router in accordance with the mapping.

2. The method of claim 1, further comprising assigning the first set of addresses to devices of a local network, wherein forwarding packets comprises forwarding packets between the devices of the local network and a global network.

3. The method of claim 1, further comprising assigning the first set of addresses to a set of devices of a local network, and assigning one or more of the addresses from the second set to one or more devices of the local network.

4. The method of claim 1, further comprising:
receiving packets having addresses of the first set; and
translating the addresses of the packets to the second set of addresses in accordance with the mapping.

5. The method of claim 4, wherein the addresses of the packets comprise source addresses.

6. The method of claim 4, wherein the addresses of the packets comprise destination addresses.

7. The method of claim 1, further comprising:
assigning the first set of addresses to devices of a local network;
receiving packets from the devices, wherein the packets have addresses of the first set of addresses;
translating the addresses of the packets to the second set of addresses in accordance with the mapping; and
forwarding the packets with the translated addresses to a global network.

8. The method of claim 1, wherein mapping a first set of addresses to a second set of addresses comprises:
assigning the addresses of the first set to devices of a local network;
receiving requests from the devices to access a global network;
selecting addresses of the second set in response to the access requests; and
generating a data structure to map the addresses assigned to the devices to the selected addresses of the second set.

9. The method of claim 1, wherein mapping a first set of addresses to a second set of addresses comprises:
assigning the addresses of the first set to devices of a local network;
generating a data structure to map addresses of the second set to the assigned addresses of the devices; and
subsequent to the generation of the data structure, servicing requests from the devices to access a global network in accordance with the data structure.

10. The method of claim 1, further comprising:
assigning the first set of addresses to a first set of devices of a local network;
assigning local addresses to a second set of devices within the local network;
mapping the local addresses to the second set of addresses; and
forwarding packets between a global network and the first and second set of devices of the local network in accordance with the mapping of local addresses.

11. The method of claim 10, further comprising maintaining a data structure within the network address translation (NAT) device representative of the mapping between the local addresses and the second set of addresses.

12. A system comprising:
a local network connecting a set of devices having addresses assigned from a first set of addresses that are defined as globally unique by a first communication protocol;
a routing device that maintains routing information in accordance with a topology of a global network, wherein the routing information includes a second set of addresses that are defined as globally unique by a second communication protocol, and wherein the routing information excludes the first set of addresses to reduce a size of the routing information within the routing device; and
a network address translation (NAT) device to map between the second set of globally unique addresses and the first set of globally unique addresses assigned to the devices.

13. The system of claim 12, further comprising one or more devices having addresses assigned from the second set of addresses.

14. The system of claim 13, wherein the NAT device forwards inbound and outbound packets of devices with addresses assigned from the second set with no addresses translation.

15. The system of claim 12, wherein the NAT device receives packets having addresses of the second set, and translates the addresses of the packets to the first set in accordance with the mapping.

16. The system of claim 15, wherein the addresses of the packets comprise source addresses.

17. The system of claim 15, wherein the addresses of the packets comprise destination addresses.

18. The system of claim 12, wherein the NAT device maintains the mapping information.

19. The system of claim 12, wherein the NAT device:
receives requests from the devices of the local network to access a global network;
selects addresses of the second set in response to the access requests; and generates a data structure to map the addresses assigned to the devices to the selected addresses of the second set.

20. The system of claim 12, wherein the NAT device:
generates a data structure to map addresses of the second set to the assigned addresses of the devices; and
subsequent to the generation of the data structure, services requests from the devices to access a global network in accordance with the data structure.

21. The system of claim 12, further comprising a second set of devices within the local network that are assigned local addresses.

22. The system of claim 21, wherein the NAT device maps between the set of local addresses assigned to the second set of devices and the second set of addresses.

23. The system of claim 22, wherein the NAT devices maintains the mapping information.

24. A computer-readable medium comprising instructions to cause a processor of a network device within an enterprise to:
map a first set of globally non-routable globally unique addresses to a second set of globally routable globally unique addresses, wherein a first network communication protocol defines the first set of addresses as globally unique addresses, wherein a second network communication protocol defines the second set of addresses as globally unique addresses, and wherein the first network communication protocol supports an address space larger than the second address space;
advertise, to a router external to the enterprise, routing information for the second set of globally unique addresses of the second network communication protocol while excluding the first set of globally unique addresses for the first network communication protocol so as to reduce a size of the routing information within the router for the first and second network communication protocols; and
forward packets in accordance with the mapping.

25. The computer-readable medium of claim 24, further comprising instructions to:
receive packets having addresses of the first set of addresses; and
translate the addresses of the packets to the second set of addresses in accordance with the mapping.

26. The computer-readable medium of claim 24, wherein the first set of addresses is assigned to a set of devices within a local network, further comprising instructions to:
receive requests from the devices to access a global network;
select addresses of the second set in response to the access requests; and
generate a data structure to map the addresses assigned to the devices to the selected addresses of the second set.

27. The computer-readable medium of claim 24, wherein the first set addresses is assigned to a set of devices within a local network, further comprising instructions to:
generate a data structure to map addresses of the second set to the assigned addresses of the device; and
subsequent to the generation of the data structure, service requests from the devices to access a global network in accordance with the data structure.

28. The computer-readable medium of claim 24, further comprising instructions to maintain the mapping information.

29. The computer-readable medium of claim 24, further comprising instructions to:
map a set of local addresses to the second set of addresses; and
forward packets to the devices in accordance with the mapping.

30. The computer-readable medium of claim 29, further comprising instructions to maintain the mapping information.

31. A system comprising:
a local network connecting a set of devices having addresses assigned from a first set of addresses, wherein a first network communication protocol defines the first set of addresses as globally unique addresses;
a network address translation (NAT) device to map between a second set of addresses and the first set of addresses assigned to the devices, wherein a second network communication protocol defines the second set of addresses as globally unique addresses; and
a routing device that maintains routing information in accordance with a topology of a global network, wherein the routing device maintains the routing information to include the second set of addresses and exclude the first set of addresses.

32. The system of claim 31, wherein the routing device issues update messages to other routing devices within the global network, wherein the update messages direct the other routing devices to generate routing information that includes the second set of addresses and excludes the first set of addresses.

33. The system of claim 31, wherein the NAT device receives packets having addresses of the second set of addresses, and translates the addresses of the packets to the first set of addresses in accordance with the mapping.

34. The system of claim 31, wherein the NAT device maintains the mapping information.

35. The system of claim 31, wherein the NAT device:
receives requests from the devices of the local network to access the global network;
selects addresses of the second set in response to the access requests; and
generates a data structure to map the addresses assigned to the devices to the selected addresses of the second set.

36. The system of claim 31, wherein the NAT device:
generates a data structure to map addresses of the second set to the assigned addresses of the devices; and
subsequent to the generation of the data structure, services requests from the devices to access the global network in accordance with the data structure.

37. The system of claim 31, further comprising a second set of devices within the local network that are assigned local addresses, wherein the NAT device maps between the second set of addresses and the local addresses.

38. The system of claim 37, wherein the routing information maintained by the routing device excludes the set of local addresses assigned to the devices.

39. The system of claim 31, further comprising one or more devices having assigned addresses from the second set of addresses.

40. The system of claim 31, wherein the NAT device forwards inbound and outbound packets of devices assigned addresses from the second set with no address translation.

41. An apparatus comprising:
a storage medium to store a mapping between a first set of addresses and a second set of addresses, wherein a first network communication protocol defines the first set of addresses as globally unique addresses, and wherein a second network communication protocol defines the second set of addresses as globally unique addresses, and wherein the first network communication protocol supports an address space larger than the second address space; and a processor to access the storage medium and translate network addresses of packets between the first a set of addresses and the second set of addresses in accordance with the mapping.

42. The apparatus of claim 41, wherein the storage medium stores routing information, and wherein the processor routes the packets in accordance with the routing information.

43. The apparatus of claim 41, wherein the routing information describes routes associated with the set of addresses.

44. The apparatus of claim 41, wherein the routing information describes routes associated with the second set of addresses.

45. A method comprising:

assigning a first set of addresses and a second set of addresses to a local network, wherein a first network communication protocol defines the first set of addresses as globally unique addresses, and wherein a second network communication protocol defines the second set of addresses as globally unique addresses;

advertising the first set of global addresses to a routing device external to the local network while excluding the second set of global addresses so as to reduce a size of routing information maintained within the router with respect to the global addresses;

translating network addresses of packets between the first set of globally unique addresses and the second set of globally unique addresses; and forwarding the packets between the local network and a global network.

46. The method of claim 45, wherein the first set of global addresses comprises global addresses advertised from the local network to the global network, and the second set of global addresses comprises non-advertised global addresses.

47. The method of claim 1, wherein the first communication protocol is the Internet Protocol (IPv6) and the second communication, protocol is the Internet (IrPv4), and wherein the first set of addresses are defined as globally unique by IPv4 and the second set of addresses are defined as globally unique by IPv6.

* * * * *

UNITED STATES PATENT AND TRADEMARK OFFICE
CERTIFICATE OF CORRECTION

| | | |
|---|---|---|
| PATENT NO. | : 7,154,891 B1 | Page 1 of 1 |
| APPLICATION NO. | : 10/132117 | |
| DATED | : December 26, 2006 | |
| INVENTOR(S) | : Ross W. Callon | |

It is certified that error appears in the above-identified patent and that said Letters Patent is hereby corrected as shown below:

Column 9, line 29 (Claim 1): "to the a second" should be -- to the second --

Column 11, line 35 (Claim 24): "reduce a size" should be -- reduce the size --

Column 11, line 55 (Claim 27): "first set addresses" should be -- first set of addresses --

Column 13, line 7 (Claim 41): "first a set of" should be -- first set of --

Column 13, line 15 (Claim 43): "the set of" should be -- the first set of --

Column 14, line 19 (Claim 47): "communication, proto-" should be -- communication proto- --

Column 14, line 20 (Claim 47): "(IrPv4)" should be -- (IPv4) --

Signed and Sealed this
Twenty-sixth Day of June, 2012

David J. Kappos
*Director of the United States Patent and Trademark Office*